(12) United States Patent
Aga et al.

(10) Patent No.: US 7,803,892 B2
(45) Date of Patent: Sep. 28, 2010

(54) AQUEOUS EMULSION COMPOSITION

(75) Inventors: Tsukasa Aga, Settsu (JP); Hirotoshi Sakashita, Settsu (JP); Masato Ioki, Settsu (JP); Masahiro Miyahara, Settsu (JP)

(73) Assignee: Daikin Industries, Ltd., Osaka (JP)

( * ) Notice: Subject to any disclaimer, the term of this patent is extended or adjusted under 35 U.S.C. 154(b) by 861 days.

(21) Appl. No.: 10/544,525

(22) PCT Filed: Feb. 5, 2004

(86) PCT No.: PCT/JP2004/001163

§ 371 (c)(1),
(2), (4) Date: Aug. 4, 2005

(87) PCT Pub. No.: WO2004/069924

PCT Pub. Date: Aug. 19, 2004

(65) Prior Publication Data
US 2006/0148353 A1 Jul. 6, 2006

(30) Foreign Application Priority Data
Feb. 10, 2003 (JP) .............................. 2003-031967

(51) Int. Cl.
C08F 14/14 (2006.01)
C08F 22/00 (2006.01)
C08F 118/02 (2006.01)
C08F 20/06 (2006.01)

(52) U.S. Cl. .................. 526/291; 526/294; 526/292.95; 526/319; 526/317.1

(58) Field of Classification Search ................. 526/291, 526/294, 292.95, 319, 317.1
See application file for complete search history.

(56) References Cited

U.S. PATENT DOCUMENTS 6,861,466 B2 * 3/2005 Dadalas et al. .............. 524/544

FOREIGN PATENT DOCUMENTS

| CA | 2356127 | | 10/2001 |
|---|---|---|---|
| EP | 1 174 484 A1 | | 1/2002 |
| JP | 1-148877 A | | 6/1989 |
| JP | 8-291468 A | | 11/1996 |
| JP | 9-59602 A | | 3/1997 |
| JP | 9-118877 A | | 5/1997 |
| JP | 9-125051 A | | 5/1997 |
| JP | 9-302335 A | | 11/1997 |
| JP | 2000-160149 A | | 6/2000 |
| JP | 2000160149 | * | 6/2000 |
| JP | 2001-49166 A | | 2/2001 |
| JP | 2001049166 | * | 2/2001 |
| JP | 2001-98033 A | | 4/2001 |
| JP | 2001098033 | * | 4/2001 |

* cited by examiner

Primary Examiner—William K Cheung
(74) Attorney, Agent, or Firm—Sughrue Mion, PLLC

(57) ABSTRACT

An aqueous emulsion composition comprising (A) an aqueous resin emulsion comprising a fluorine-containing polymer and (B) a surfactant of the formula:

$$R^1O-(CH_2CH_2O)_p-(R^2O)_q-R^3 \qquad (1)$$

wherein $R^1$ is an alkyl group or an alkenyl group, $R^2$ is an alkylene group, $R^3$ is a hydrogen atom, an alkyl group or an alkenyl group, p is the number of at least 2, q is the number of at least 1, and p and q are such numbers that the weight ratio of the polyoxyethylene block is from 5 to 80% by weight based on whole molecule, is excellent in stability against impurity and mechanical stability.

5 Claims, No Drawings

AQUEOUS EMULSION COMPOSITION

TECHNICAL FIELD

The present invention relates to an aqueous emulsion composition which is excellent in the stability against mechanical impact in the treatment bath and the stability in the presence of impurity in the treatment bath at the treatment with aqueous resin emulsion, which can maintain high water- and oil-repellency and its durability.

BACKGROUND ARTS

It is known that a polymer prepared from a polymerizable compound having a perfluoroalkyl or perfluoroalkenyl group and an acrylate or methacrylate group is useful as a water- and oil-repellent agent used for a textile and woven fabric. Particularly an aqueous dispersion wherein said polymer is dispersed in an aqueous medium with an emulsifier is industrially and widely used.

A water- and oil repellent agent processing bath prepared by diluting conventional aqueous dispersions, however, often has the problems that a impurity attached to a processed fabric during a pretreatment step incorporates into the bath in a treatment step, and then the dispersibility of the aqueous dispersion is deteriorated, emulsion particles may agglomerate and precipitation may be caused, or the dispersion is broken because of a mechanical impact exerted when a treated fabric enters into the bath or leaves from the bath, emulsion particles may agglomerate and precipitation may be caused, so that the water- and oil-repellency performance is deteriorated and the polymer attaches to a roll to give a soiled fabric. That is, the conventional aqueous dispersions are insufficient in stability against impurity and mechanical stability during treatment step.

Methods having excellent stability against impurity are proposed in JP-A-9-118877, JP-A-9-125051 and JP-A-9-302335, but do not always provide sufficiently satisfactory stability in connection with variety of recent water- and oil-repellent treatments.

DISCLOSURE OF THE INVENTION

An object of the present invention is to provide an aqueous emulsion composition excellent in impurity stability and mechanical stability, and a processing method comprising the same.

The present invention provides an aqueous emulsion composition comprising:
(A) an aqueous resin emulsion comprising
  a homopolymer or copolymer comprising at least one polymerizable compound having a perfluoroalkyl or perfluoroalkenyl group and an acrylate, methacrylate or alpha-substituted acrylate group, or
  a copolymer comprising said polymerizable compound and another compound copolymerizable therewith, and
(B) a surfactant of the formula:

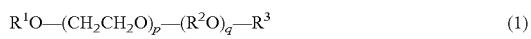

wherein $R^1$ is an alkyl group having 1 to 22 carbon atoms or an alkenyl group having 2 to 22 carbon atoms,
$R^2$ is an alkylene group having at least 3 carbon atoms,
$R^3$ is a hydrogen atom, an alkyl group having 1 to 22 carbon atoms or an alkenyl group having 2 to 22 carbon atoms,
p is the number of at least 2,
q is the number of at least 1, and
p and q are such numbers that the weight ratio of the polyoxyethylene block is from 5 to 80% by weight based on whole molecule,
  wherein the surfactant (B) is added to the aqueous resin emulsion (A).

MODE FOR CARRYING OUT THE INVENTION

The aqueous resin emulsion is an aqueous emulsion of a fluorine-containing polymer.

The fluorine-containing polymer is a homopolymer of a fluorine-containing monomer, a copolymer of at least two 2 fluorine-containing monomers, or a copolymer of a fluorine-containing monomer and another polymerizable compound copolymerizable with the fluorine-containing monomer.

The fluorine-containing monomer is a polymerizable compound having a perfluoroalkyl or perfluoroalkenyl group and an acrylate, methacrylate or alpha-substituted acrylate group.

Examples of the polymerizable compound having a perfluoroalkyl or perfluoroalkenyl group and an acrylate, methacrylate or alpha-substituted acrylate group are (meth)acrylate esters represented by the formulas:

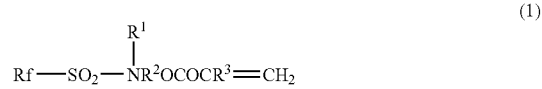

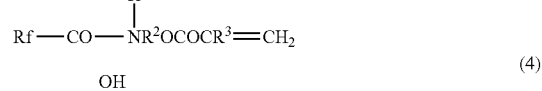

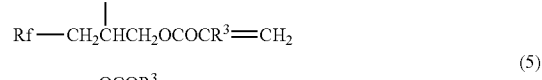

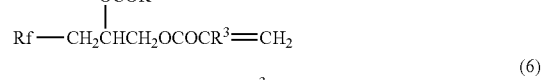

wherein Rf is a perfluoroalkyl group or perfluoroalkenyl group having 1 to 21 (for example, 3 to 21) carbon atoms,
$R^1$ is hydrogen or an alkyl group having 1 to 10 carbon atoms,
$R^2$ is an alkylene group having 1 to 10 carbon atoms,
$R^3$ is a hydrogen atom, a methyl group, a fluorine atom, a chlorine atom, a bromine atom, an iodine atom, a $CFX^1X^2$ group (provided that $X^1$ and $X^2$ are a hydrogen atom, a fluorine atom, a chlorine atom, a bromine atom or an iodine atom.), a cyano group, a linear or branched fluoroalkyl group having 1 to 21 carbon atoms, a substituted or unsubstituted benzyl group, or a substituted or unsubstituted phenyl group,
Ar is an aryl group which may have a substituent group, and
n is an integer of 1 to 10.

In the above formulas, the Rf group is preferably a perfluoroalkyl group. The carbon number of the Rf group is from 1 to 21, particularly from 2 to 20, especially from 4 to 16, for example, from 6 to 14. The carbon number of the Rf group may be from 1 to 6, particularly from 1 to 4. Examples of the Rf group are —$CF_3$, —$CF_2CF_3$, —$CF_2CF_2CF_3$, —$CF(CF_3)_2$, —$CF_2CF_2CF_2CF_3$, —$CF_2CF(CF_3)_2$, —$C(CF_3)_3$, —$(CF_2)_4CF_3$, —$(CF_2)_2CF(CF_3)_2$, —$CF_2C(CF_3)_3$, —$CF(CF_3)CF_2CF_2CF_3$, —$(CF_2)_5CF_3$, —(CF$_2$)$_3$CF(CF$_3$)$_2$, —(CF$_2$)$_4$CF(CF$_3$)$_2$, —(CF$_2$)$_7$CF$_3$, —(CF$_2$)$_5$CF(CF$_3$)$_2$, —(CF$_2$)$_6$CF(CF$_3$)$_2$ and —(CF$_2$)$_9$CF$_3$.

Specific examples of the polymerizable compound having an acrylate or methacrylate group are as follows:

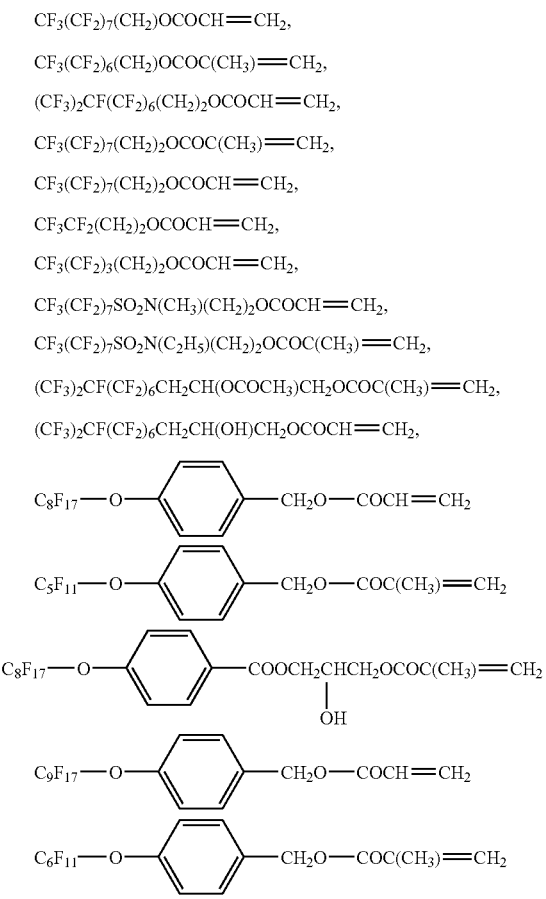

In the alpha-substituted acrylate group, examples of the alpha-substituent are a halogen atom, an alkyl group (for example, having 1 to 21 carbon atoms) wherein a hydrogen atom is substituted with a halogen atom (for example, a monofluoromethyl group or difluoromethyl group), a cyano group, an aromatic group (for example, a substituted or unsubstituted benzyl group, and a substituted or unsubstituted phenyl group).

Examples of the fluorine-containing polymerizable compound having the alpha-substituted acrylate group are as follows:

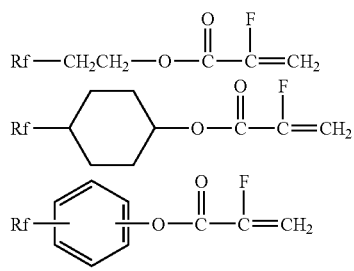

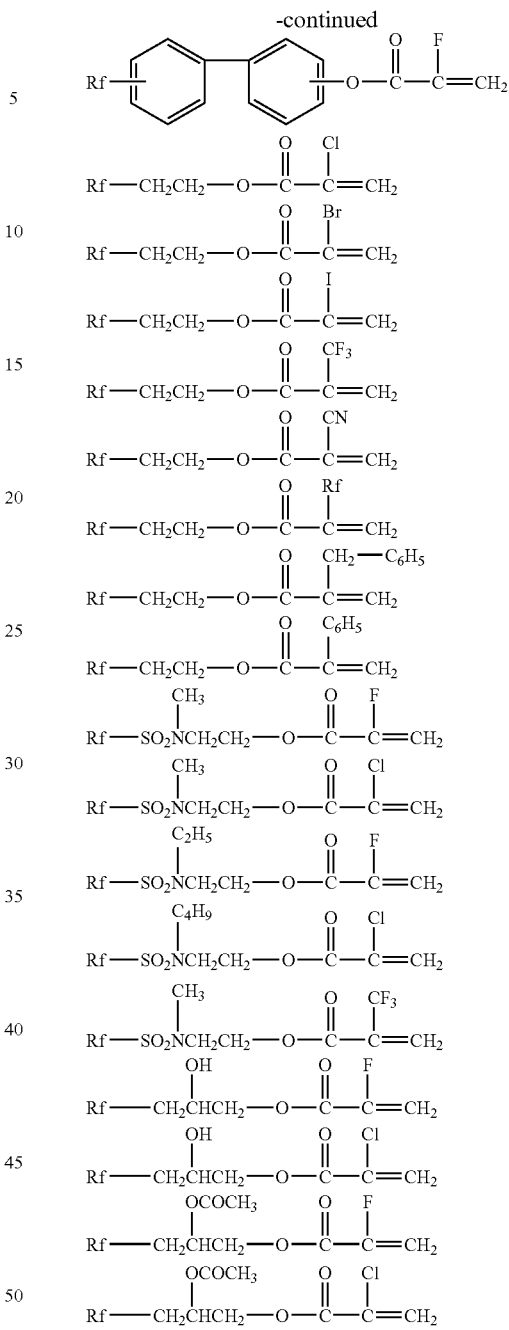

wherein Rf is a linear or branched perfluoroalkyl or perfluoroalkenyl group having 1 to 21 carbon atoms.

The another copolymerizable compound may be various. Examples of the another copolymerizable compound include:

(1) acrylic acid and methacrylic acid, and methyl, ethyl, butyl, isobutyl, t-butyl, propyl, 2-ethylhexyl, hexyl, decyl, lauryl, stearyl, isobornyl, β-hydroxyethyl, glycidyl, phenyl, benzyl and 4-cyanophenyl esters thereof;

(2) vinyl esters of fatty acids such as acetic acid, propionic acid, caprylic acid, lauric acid and stearic acid;

(3) styrene compounds such as styrene, a-methylstyrene and p-methylstyrene;

(4) vinyl and vinylidene halide compounds such as vinyl fluoride, vinyl chloride, vinyl bromide, vinylidene fluoride and vinylidene chloride;
(5) fatty acid allyl esters such as allyl heptanoate, allyl caprylate and allyl caproate;
(6) vinyl alkyl ketones such as vinyl methyl ketone and vinyl ethyl ketone;
(7) acryl amides such as N-methylacrylamide and N-methylolmethacrylamide; and
(8) dienes such as 2,3-dichloro-1,3-butadiene and isoprene.

A chlorine-containing polymerizable compound (for example, vinyl chloride and vinylidene chloride) (for example, in the amount of 1 to 50% by weight based on the polymer) is preferably contained as the another polymerizable compound The average molecular weight of the fluorine-containing polymer (A) may be from 1,000 to 10,000,000, for example, from 1,000 to 1,000,000.

The surfactant (B) is a surfactant of the formula:

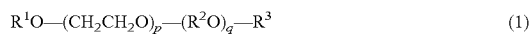

$$R^1O\text{---}(CH_2CH_2O)_p\text{---}(R^2O)_q\text{---}R^3 \quad (1)$$

wherein $R^1$ is an alkyl group having 1 to 22 carbon atoms or an alkenyl group having 2 to 22 carbon atoms,
$R^2$ is an alkylene group having at least 3 carbon atoms,
$R^3$ is a hydrogen atom, an alkyl group having 1 to 22 carbon atoms or an alkenyl group having 2 to 22 carbon atoms,
p is the number of at least 2,
q is the number of at least 1, and
p and q are such numbers that the weight ratio of the polyoxyethylene block is from 5 to 80% by weight based on whole molecule, In the surfactant (B), q may be the number of at least 2. That is, $\text{---}(R^2O)_q\text{---}$ may form the polyoxyalkylene chain.

The surfactant (B) is a polyoxyethylenealkylene alkyl ether having a hydrophilic polyoxyethylene chain in the molecular center and a hydrophobic oxyalkylene chain (particularly, polyoxyalkylene chain). Examples of the hydrophobic oxyalkylene chain include an oxypropylene chain, an oxybutylene chain and a styrene chain. Among them, the oxypropylene chain is preferable.

Examples of the surfactant (B) include the followings:

$C_{10}H_{21}O\text{---}(CH_2CH_2O)_p\text{---}(C_3H_6O)_q\text{---}H$

$C_{12}H_{25}O\text{---}(CH_2CH_2O)_p\text{---}(C_3H_6O)_q\text{---}H$

$C_{16}H_{31}O\text{---}(CH_2CH_2O)_p\text{---}(C_3H_6O)_q\text{---}H$

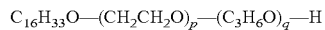

$C_{16}H_{33}O\text{---}(CH_2CH_2O)_p\text{---}(C_3H_6O)_q\text{---}H$

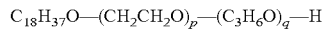

$C_{18}H_{37}O\text{---}(CH_2CH_2O)_p\text{---}(C_3H_6O)_q\text{---}H$

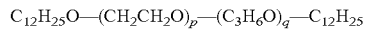

$C_{12}H_{25}O\text{---}(CH_2CH_2O)_p\text{---}(C_3H_6O)_q\text{---}C_{12}H_{25}$

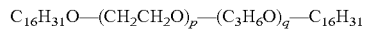

$C_{16}H_{31}O\text{---}(CH_2CH_2O)_p\text{---}(C_3H_6O)_q\text{---}C_{16}H_{31}$

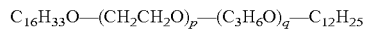

$C_{16}H_{33}O\text{---}(CH_2CH_2O)_p\text{---}(C_3H_6O)_q\text{---}C_{12}H_{25}$ wherein p and q are the same as the above.

The ratio of the polyoxyethylene block may be from 5 to 80% by weight, for example, from 30 to 75% by weight, particularly form 40 to 70% by weight, based on the molecular weight of the surfactant (B) (copolymer).

The average molecular weight of the surfactant (B) is generally from 300 to 5,000, for example, from 500 to 3,000.

The surfactant (B) may be used alone or in combination of at least two. The surfactant (B) is added as a protective colloid to the polymerized aqueous resin emulsion for the purpose of increasing the stability of the aqueous resin emulsion after the polymerization. The amount of the surfactant (B) may be from 0.01 to 30 parts by weight, for example, from 1 to 20 parts by weight, based on 100 parts by weight of the polymer.

In addition to the surfactant (B), another surfactant (C) other than the surfactant (B) can be used. Examples of the surfactant (C) include a cationic emulsifier, an anionic emulsifier or a non-ionic emulsifier. The cationic surfactant, the non-ionic emulsifier and a mixture of both are preferable.

The cationic emulsifier includes dodecyl trimethyl ammonium acetate, trimethyl tetradecyl ammonium chloride, hexadecyl trimethyl ammonium bromide, trimethyl octadecyl ammonium chloride, (dodecylmethylbenzyl) trimethyl ammonium chloride, benzyl dodecyl dimethyl ammonium chloride, methyl dodecyl di(hydropolyoxyethylene) ammonium chloride, benzyl dodecyl di(hydropolyoxyethylene) ammonium chloride and N-[2-(diethylamino)ethyl]oleamide hydrochloride.

The non-ionic emulsifier includes a condensate product of ethylene oxide and hexyl phenol, isooctyl phenol, hexadecanol, oleic acid, alkane($C_{12}$-$C_{16}$) thiol, sorbitan monofatty acid($C_7$-$C_{19}$), alkyl($C_{12}$-$C_{18}$) amine or the like. The amount of the surfactant (C) is from 0.01 to 30 parts by weight, for example, from 1 to 20 parts by weight, based on 100 parts by weight of the polymer (A).

The composition of the present invention may contain an antifoaming agent depending on the necessity. Particularly when the increase of foam caused by the containment of the surfactant will be apprehended, it is necessary to use the antifoaming agent. The antifoaming agent include various types for aqueous system and examples of the antifoaming agent include lower alcohols such as methanol, ethanol and butanol; higher alcohols such as amyl alcohol, polypropylene glycol and derivatives thereof; oils and fats such as oleic acid, tall oil, mineral oil and soap; surfactants such as sorbitan fatty acid ester, polyethylene glycol fatty acid ester and Pluronic nonionic surfactant; silicone surfactants such as siloxane and silicone resin. These are used alone or in combination. Representatives of commercially available antifoaming agents are B-series such as ADEKANATE B and ADEKANATE B1068 (available from Asahi Denka Co., Ltd.); FOAMASTER DL, NOPCO NXZ, DEFOAMER series such as SN DEFOAMER 113, 325, 308 and 368; DEHYDRAN 1293, DEHYDRAN 1513 (available from San Nopco Ltd.); FLOWNON SB-110N, SB-210, 510, 551, AQUALEN 800, 805, AQUALEN 1488 (available from Kyoeisya Chemical Co., Ltd.); SURFYNOL 104E (acetylene-based antifoaming agent available from Air Products and Chemicals, Inc.); KS-607A (available from Shin-Etsu Chemical Co., Ltd.); FS ANTIFOAM (available from Dow Corning Inc.); BYK-020, 031, 073, W (available from BYK Chemie); DEHYDRAN 981 (available from Henkel Japan Co., Ltd.); EPAN-410, 710, 720 (available from Dai-ichi Kogyo Seiyaku Co., Ltd.); TEGO FORMEX Series (available from Tego Goldschmidt); and FOAMLEX-747, TY-10, EP series (available from Nicca Chemical Co., Ltd.). The amount of the antifoaming agent is preferably from 0.01 to 10% by weigh, more preferably from 0.05 to 5% by weight, based on the aqueous resin emulsion.

In the present invention, an organic solvent may be optionally added for the purpose of increasing the dispersibility of the polymer. Examples of the organic solvent are ketones such as acetone and methyl ethyl ketone; ethylene glycol derivatives such as ethylene glycol and polyethylene glycol; alkyl ethers of ethylene glycol derivatives such as polyethylene glycol monomethyl ether, polyethylene glycol dimethyl ether and polyethylene glycol monobutyl ether; propylene glycol derivatives such as propylene glycol, dipropylene glycol, tripropylene glycol and polypropylene glycol; polyethers such cyclodextrin and dextrin; esters such as methyl acetate and ethyl acetate; and N-alkyl pyrrolidone. The amount of the organic solvent may be from 5 to 200 parts by weight, for example, from 10 to 100 parts by weight, particularly from 20 to 80 parts by weight, based on 100 parts by weight of the polymer.

If necessary, the aqueous dispersion liquid may contain additives such as an organic acid, a crosslinking agent, another polymer, another water-repellent agent and/or oil-repellent agent, a mothproofing agent, a flame retardant, an antistatic agent, a dye stabilizing agent, and anti-crease agent.

The crosslinking agent includes a blocked isocyanate compound, a melamine resin compound, a glyoxal resin compound, a urea resin compound, a polymer comprising a crosslinkable monomer (for example, N-methylol acrylamide, and a blocked material of 2-isocyanatoethyl methacrylate) as an essential polymerization unit. The blocked isocyanate compound and the melamine resin compound are preferable. The blocked isocyanate compound is preferably a compound which is free of a polymerizable unsaturated group, and which has the structure wherein an isocyanate group of the polyisocyanate is blocked with a blocking agent. The melamine resin compound includes trimethylol melamine and hexamethylol melamine.

The aqueous dispersion liquid of the present invention can be prepared by emulsion-polymerizing the polymerizable compound in water containing the organic solvent in the presence of a polymerization initiator and optionally a surfactant to give the polymer emulsion (A), and then adding the surfactant (B) and optionally water to the polymer emulsion.

A substrate to which the aqueous dispersion liquid is applied is a textile or a solid sheet. The substrate is preferably a sheet-shaped material, for example, a fabric. The textile includes a fiber as such, a yarn made from the fiber, a fabric made from the fiber. The solid sheet is a sheet free of voids, unlike the fabric made of fiber.

The substrate may be a film, a fiber, a yarn, a woven fabric, a carpet, or a sheet made from a filament, fiber or yarn prepared from a natural polymer material, a modified natural polymer material or a synthesized polymer material.

The dispersion liquid according to the present invention can be applied to the substrate preferably by coating, dipping, spraying, padding, roll coating, or combination of these procedures. For example, a padding bath having the bath solid content of 0.1 to 10% by weight can be used. The substrate is padded in the padding bath, and then excess liquid is usually removed by a squeezing roll to give the dry pickup amount (the weight of dry polymer on the substrate) of from 0.01 to 10% by weight based on the weight of the substrate. Then, the treated substrate is preferably heated at 100-200° C. depending on the necessity.

PREFERRED EMBODIMENTS OF THE INVENTION

Examples and Comparative Examples are shown hereinafter to illustrate the present invention in detail.

Properties are determined as follows:

Water- and Oil-Repellency

The polymer dispersion liquid is diluted with water to give a treatment liquid having a solid content of 0.5% by weight. A polyester fabric is immersed in the treatment liquid, squeezed with a mangle to give a wet pickup of 65%, dried at 100° C. for two minutes, heated at 160° C. for one minute, and then subjected to an evaluation of water- and oil-repellency.

The water-repellency is expressed by the water repellency No. (cf. the following Table 1) determined by the spray method according to JIS (Japanese Industrial Standard) L-1092.

The oil-repellency is determined by dropping several drops of a test solution shown in the following Table 2 according to AATCC-TM118 on two positions of a surface of a test cloth and observing the penetration state of the drops after 30 seconds. The maximum point at which the test solution exhibits no penetration is expressed by the oil-repellency.

TABLE 1

| Water repellency No. | State |
|---|---|
| 5 | No wet on the surface |
| 4 | Slight wet on the surface |
| 3 | Partial wet on the surface |
| 2 | Wet on the surface |
| 1 | Wet over the whole surface |

TABLE 2

| Oil-repellency | Test solution | Surface tension (dyne/cm, 25° C.) |
|---|---|---|
| 8 | n-Heptane | 20.0 |
| 7 | n-Octane | 21.8 |
| 6 | n-Decane | 23.5 |
| 5 | n-Dodecane | 25.0 |
| 4 | n-Tetradecane | 26.7 |
| 3 | n-Hexadecane | 27.3 |
| 2 | n-Hexadecane/Nujol mixture solution (35/65 by weight) | 29.6 |
| 1 | Nujol | 31.2 |
| 0 | Inferior to 1 | — |

Wash Durability of Water- and Oil-Repellency

The wash according to JIS L-0217-103 is repeatedly conducted three times and then the water- and oil-repellency (HL-3) is evaluated.

Storage Stability

After the aqueous dispersion (solid content: 30% by weight) is stored at 40° C. for one month, the generation of precipitate is observed.

Good: No precipitation
Fair: Slight precipitation
Poor: Much precipitation

Impurity Stability

The aqueous dispersion is diluted with tap water to give a solid content of 0.6% by weight. 0.03% by weight of a fixing agent for nylon is added to the diluted dispersion and intimately stirred. The generation of agglomerate is observed.

Good: No agglomerate generated
Fair: Slight agglomerate generated
Poor: Much agglomerate generated Storage Stability After the aqueous dispersion (solid content: 30% by weight) is stored at 40° C. for one month, the generation of precipitate is observed.

Good: No precipitation
Fair: Slight precipitation
Poor: Much precipitation

EXAMPLE 1

Into a 1 L autoclave, $C_nF_{2n+1}CH_2CH_2OCOCH=CH_2$ (a mixture of compounds wherein n is 6, 8, 10, 12 and 14 (average of n: 8)) (150 g), stearyl acrylate (75 g), 3-chloro-2-hydroxypropyl methacrylate (3 g), pure water (300 g), tripropylene glycol (80 g), acetic acid (0.45 g), octadecyl trimethyl ammonium chloride (6 g) and polyoxyethylene lauryl ether (9 g) were charged and emulsified by ultrasonic wave at 60° C. for 15 minutes with stirring. After the emulsification, n-dodecyl mercaptan (1.5 g) was added and vinyl chloride (45 g) was injected. Further, 2,2'-azobis(2-amidinopropane) dihydrochloride (1.12 g) was added and the reaction was conducted at 60° C. for 5 hours to give an aqueous emulsion of the polymer. $C_{12}H_{25}O-(C_2H_4O)_a-(C_3H_6O)_b-H$ (the average in polyoxyethylene chain is 10 mol, and the average in polyoxypropylene chain is 4 mol) (3 g) was added to the aqueous polymer emulsion and stirred for 1 hour to give an aqueous dispersion liquid.

EXAMPLE 2

Into a 1 L autoclave, $C_nF_{2n+1}CH_2CH_2OCOCH=CH_2$ (a mixture of compounds wherein n is 6, 8, 10, 12 and 14 (average of n: 8)) (150 g), stearyl acrylate (37.5 g), 2-ethylhexyl methacrylate (37.5 g), diacetone acrylamide (1.8 g), 3-chloro-2-hydroxypropyl methacrylate (1.2 g), pure water (300 g), dipropylene glycol monomethyl ether (70 g), acetic acid (0.45 g), di-hardened tallow alkyl dimethyl ammonium chloride (6 g) and polyoxyethylene cetyl ether (9 g) were charged and emulsified by ultrasonic wave at 60° C. for 15 minutes with stirring. After the emulsification, n-dodecyl mercaptan (1.5 g) was added and vinyl chloride (45 g) was injected. Further, 2,2'-azobis(2-amidinopropane) dihydrochloride (1.12 g) was added and the reaction was conducted at 60° C. for 5 hours to give an aqueous emulsion of the polymer. $C_{12}H_{25}O-(C_2H_4O)_a-(C_3H_6O)_b-H$ (the average in polyoxyethylene chain is 14 mol, and the average in polyoxypropylene chain is 2 mol) (3 g) was added to the aqueous polymer emulsion and stirred for 1 hour to give an aqueous dispersion liquid.

EXAMPLE 3

Into a 1 L flask, $C_nF_{2n+1}CH_2CH_2OCOCH=CH_2$ (a mixture of compounds wherein n is 6, 8, 10, 12 and 14 (average of n: 8)) (100 g), stearyl acrylate (50 g), N-methylol acrylamide (2 g), pure water (200 g), dipropylene glycol monomethyl ether (50 g), acetic acid (0.3 g), polyoxyethylene lauryl ether (4 g) and polyoxyethylene cetyl ether (10 g) were charged and emulsified by ultrasonic wave at 60° C. for 15 minutes with stirring. 2,2'-azobis(2-amidinopropane) dihydrochloride (0.75 g) was added and the reaction was conducted at 60° C. for 5 hours to give an aqueous emulsion of the polymer. $C_{12}H_{25}O-(C_2H_4O)_a-(C_3H_6O)_b-H$ (the average in polyoxyethylene chain is 10 mol, and the average in polyoxypropylene chain is 4 mol) (2 g) was added to the aqueous polymer emulsion and stirred for 1 hour to give an aqueous dispersion liquid.

EXAMPLE 4

Into a 1 L flask, $C_nF_{2n+1}CH_2CH_2OCOCH=CH_2$ (a mixture of compounds wherein n is 6, 8, 10, 12 and 14 (average of n: 8)) (100 g), stearyl acrylate (50 g), diacetone acrylamide (2 g), pure water (200 g), dipropylene glycol monomethyl ether (50 g), acetic acid (0.3 g), di-hardened tallow alkyl dimethyl ammonium chloride (4 g) and polyoxyethylene cetyl ether (8 g) were charged and emulsified by ultrasonic wave at 60° C. for 15 minutes with stirring. Further, 2,2'-azobis(2-amidinopropane) dihydrochloride (0.75 g) was added and the reaction was conducted at 60° C. for 5 hours to give an aqueous emulsion of the polymer. $C_{12}H_{25}O-(C_2H_4O)_a-(C_3H_6O)_b-H$ (the average in polyoxyethylene chain is 10 mol, and the average in polyoxypropylene chain is 4 mol) (1.6 g) was added to the aqueous polymer emulsion and stirred for 1 hour to give an aqueous dispersion liquid.

EXAMPLE 5

Into a 1 L flask, $C_nF_{2n+1}CH_2CH_2OCOCH=CH_2$ (a mixture of compounds wherein n is 6, 8, 10, 12 and 14 (average of n: 8)) (100 g), stearyl acrylate (25 g), lauryl acrylate (25 g), N-methylol acrylamide (1.2 g), 3-chloro-2-hydroxypropyl methacrylate (0.8 g), pure water (200 g), tripropylene glycol (50 g), ethylene glycol (10 g), acetic acid (0.3 g), octadecyl trimethyl ammonium chloride (4 g) and polyoxyethylene cetyl ether (8 g) were charged and emulsified by ultrasonic wave at 60° C. for 15 minutes with stirring. 2,2'-azobis(2-amidinopropane) dihydrochloride (0.75 g) was added and the reaction was conducted at 60° C. for 5 hours to give an aqueous emulsion of the polymer. $C_{12}H_{25}O-(C_2H_4O)_a-(C_3H_6O)_b-H$ (the average in polyoxyethylene chain is 14 mol, and the average in polyoxypropylene chain is 2 mol) (1.6 g) was added to the aqueous polymer emulsion and stirred for 1 hour to give an aqueous dispersion liquid.

COMPARATIVE EXAMPLE 1

Used was an aqueous dispersion liquid prepared in the same manner as in Example 1 except that $C_{12}H_{25}O-(C_2H_4O)_a-(C_3H_6O)_b-H$ (the average in polyoxyethylene chain is 10 mol. and the average in polyoxypropylene chain is 4 mol) was not added to the aqueous emulsion.

COMPARATIVE EXAMPLE 2

Used was an aqueous dispersion liquid prepared in the same manner as in Example 2 except that $C_{16}H_{33}O-(C_3H_6O)_a-(C_2H_4O)_b-H$ (the average in polyoxyethylene chain is 10 mol, and the average in polyoxypropylene chain is 4 mol) was used instead of $C_{12}H_{25}O-(C_2H_4O)_a-(C_3H_6O)_b-H$ (the average in polyoxyethylene chain is 14 mol, and the average in polyoxypropylene chain is 2 mol) for the aqueous emulsion.

COMPARATIVE EXAMPLE 3

Used was an aqueous dispersion liquid prepared in the same manner as in Example 3 except that $C_{16}H_{33}O-(C_3H_6O)_a-(C_2H_4O)_b-H$ (the average in polyoxyethylene chain is 10 mol, and the average in polyoxypropylene chain is 4 mol) was used instead of $C_{12}H_{25}O-(C_2H_4O)_a-(C_3H_6O)_b-H$ (the average in polyoxyethylene chain is 10 mol, and the average in polyoxypropylene chain is 4 mol) for the aqueous emulsion.

COMPARATIVE EXAMPLE 4

Used was an aqueous dispersion liquid prepared in the same manner as in Example 4 except that $C_{16}H_{33}O-(C_3H_6O)_a-(C_2H_4O)_b-H$ (the average in polyoxyethylene chain is 20 mol, and the average in polyoxypropylene chain is 8 mol) was used instead of $C_{12}H_{25}O-(C_2H_4O)_a-(C_3H_6O)_b-H$ (the average in polyoxyethylene chain is 10 mol, and the average in polyoxypropylene chain is 4 mol) for the aqueous emulsion.

COMPARATIVE EXAMPLE 5

Used was an aqueous dispersion liquid prepared in the same manner as in Example 5 except that $C_{12}H_{25}O-(C_2H_4O)_a-(C_3H_6O)_b-H$ (the average in polyoxyethylene chain is 14 mol, and the average in polyoxypropylene chain is 2 mol) was not added to the aqueous emulsion.

TABLE 3

| | Water-and oil-repellency | | | | | | |
| | Initial | | HL-3 | | | | |
| | Water repellency | Oil repellency | Water repellency | Oil repellency | Mechanical stability | Impurity stability | Storage stability |
|---|---|---|---|---|---|---|---|
| Example 1 | 5 | 6 | 5 | 4 | Good | Good | Good |
| Example 2 | 5 | 6 | 5 | 5 | Good | Good | Good |
| Example 3 | 5 | 5 | 4 | 4 | Good | Good | Fair |
| Example 4 | 5 | 5 | 5 | 4 | Good | Good | Good |
| Example 5 | 5 | 6 | 4 | 5 | Good | Good | Good |
| Comparative Example 1 | 5 | 6 | 5 | 4 | Fair | Fair | Fair |
| Comparative Example 2 | 5 | 6 | 5 | 5 | Fair | Fair | Fair |
| Comparative Example 3 | 5 | 5 | 4 | 4 | Poor | Poor | Poor |
| Comparative Example 4 | 5 | 5 | 4 | 4 | Fair | Fair | Fair |
| Comparative Example 5 | 5 | 5 | 4 | 4 | Fair | Poor | Fair |

EFFECTS OF THE INVENTION

The aqueous dispersion liquid of the present invention is excellent in stability in the presence of impurity in a treatment bath, excellent in stability against mechanical impact in the treatment bath, and can maintain high water- and oil-repellency and high durability of water- and oil-repellency. The aqueous dispersion liquid does not have precipitation of particles and does not have the attachment of a polymer to a roll causing a soiled fabric.

The invention claimed is:

1. An aqueous emulsion composition comprising:
   (A) an aqueous resin emulsion comprising
      a homopolymer or copolymer comprising at least one polymerizable compound having a perfluoroalkyl or perfluoroalkenyl group and an acrylate or methacrylate group, or
      a copolymer comprising said polymerizable compound and another compound copolymerizable therewith, and
   (B) a surfactant of the formula:

$$R^1O—(CH_2CH_2O)_p—(R^2O)_q—R^3 \qquad (1)$$

wherein $R^1$ is an alkyl group having 1 to 22 carbon atoms or an alkenyl group having 2 to 22 carbon atoms,
   $R^2$ is propylene,
   $R^3$ is a hydrogen atom,
   p is the number of at least 2,
   q is the number of at least 1, and
   p and q are such numbers that the weight ratio of the polyoxyethylene block is from 5 to 80% by weight based on whole molecule,
   wherein the surfactant (B) is added to the aqueous resin emulsion (A), after the polymerizable compound is emulsion-polymerized to give the aqueous resin emulsion (A) comprising the homopolymer or copolymer.

2. The composition according to claim 1, which further contains an antifoaming agent.

3. A method of treating a substrate, which comprises using the composition according to claim 1.

4. The method according to claim 3, which is for the purpose of imparting water- and oil-repellency to a textile.

5. A method of producing aqueous emulsion composition comprising:
   (A) an aqueous resin emulsion comprising
      a homopolymer or copolymer comprising at least one polymerizable compound having a perfluoroalkyl or perfluoroalkenyl group and an acrylate or methacrylate group, or
      a copolymer comprising said polymerizable compound and another compound copolymerizable therewith, and
   (B) a surfactant of the formula:

$$R^1O—(CH_2CH_2O)_p—(R^2O)_q—R^3 \qquad (1)$$

wherein $R^1$ is an alkyl group having 1 to 22 carbon atoms or an alkenyl group having 2 to 22 carbon atoms,
   $R^2$ is an alkylene group having at least 3 carbon atoms,
   $R^3$ is a hydrogen atom,
   p is the number of at least 2,
   q is the number of at least 1, and
   p and q are such numbers that the weight ratio of the polyoxyethylene block is from 5 to 80% by weight based on whole molecule,
   said method comprising:
   emulsion-polymerizing the polymerizable compound to give the aqueous resin emulsion (A) comprising the homopolymer or copolymer; and then
   adding the surfactant (B) to the aqueous resin emulsion (A) to give the aqueous emulsion composition.

* * * * *